(12) United States Patent
Seshime et al.

(10) Patent No.: US 6,195,324 B1
(45) Date of Patent: Feb. 27, 2001

(54) DISK PLAYER

(75) Inventors: Yoshihiro Seshime; Yuji Ikedo; Masashi Kurosawa; Masamitsu Ohkawara; Yoshihiro Ichikawa; Yuji Morita, all of Saitama-ken (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/271,379

(22) Filed: Mar. 18, 1999

(30) Foreign Application Priority Data

Mar. 20, 1998 (JP) .................................................. 10-072901
Sep. 30, 1998 (JP) .................................................. 10-277402

(51) Int. Cl.⁷ ............................ G11B 17/04; G11B 33/04
(52) U.S. Cl. .................. 369/77.2; 360/99.06; 360/99.02
(58) Field of Search ................................. 369/77.2, 77.1, 369/75.2, 75.1; 360/99.02, 99.06

(56) References Cited

U.S. PATENT DOCUMENTS 5,625,612 * 4/1997 Tozune et al. ....................... 369/77.2
5,901,130 * 5/1999 Fukuyama et al. .................. 369/77.2
5,995,469 * 11/1999 Uwabo et al. ....................... 369/77.2

* cited by examiner

Primary Examiner—William Klimowicz
(74) Attorney, Agent, or Firm—Arent Fox Kintner Plotkin & Kahn PLLC

(57) ABSTRACT

A disk player has a disk cartridge for being loaded thereon, and accommodating a disk-type recording medium. The disk cartridge has a shutter arranged thereon, for performing slide-opening/closing in order to expose an information surface of the disk-type recording medium. The disk player is comprised of a carrier mechanism for carrying the disk cartridge to an information regenerating location and an information recording location, and a shutter sliding mechanism for slide-opening/closing the shutter. The shutter assumes an intermediate position of sliding when the disk cartridge is located at one of the information regenerating location and the information recording location, and assumes a terminal position of sliding when the shutter is located at the other one of the locations. The disk player also includes a. driving mechanism comprised of an engaging element and an engaged element which is separated from the engaging element when the information recording mechanism is not driven.

4 Claims, 10 Drawing Sheets

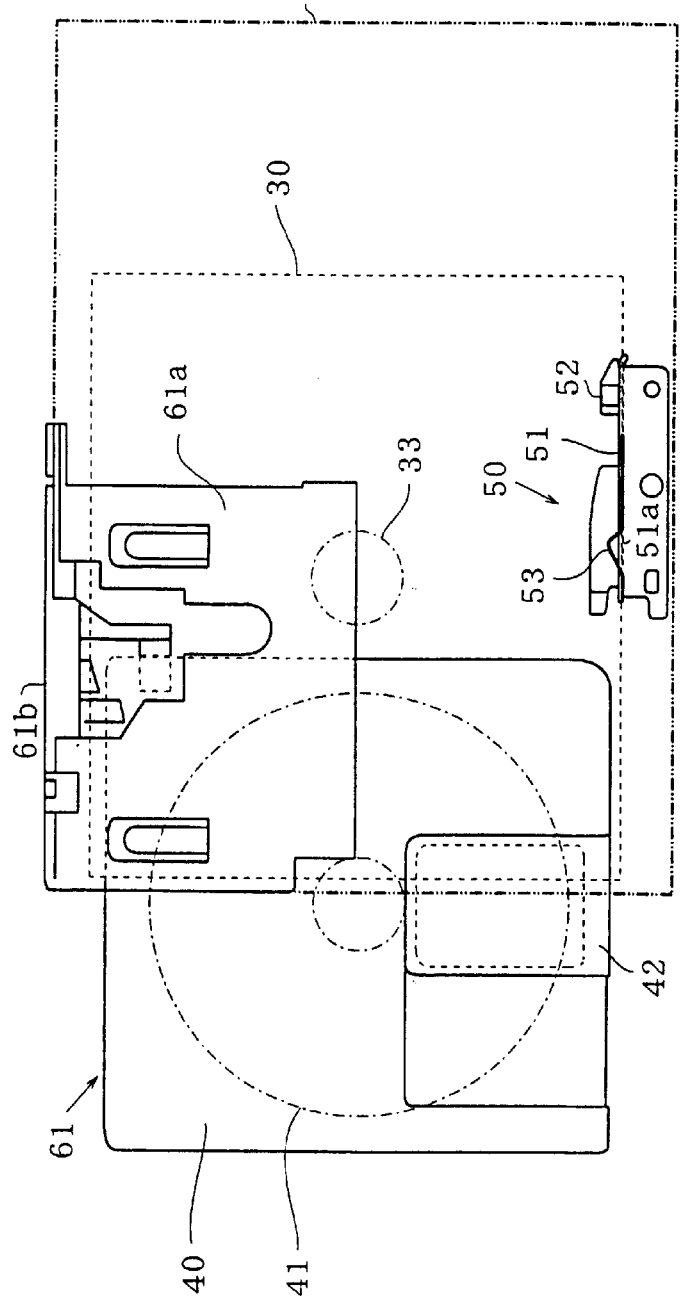
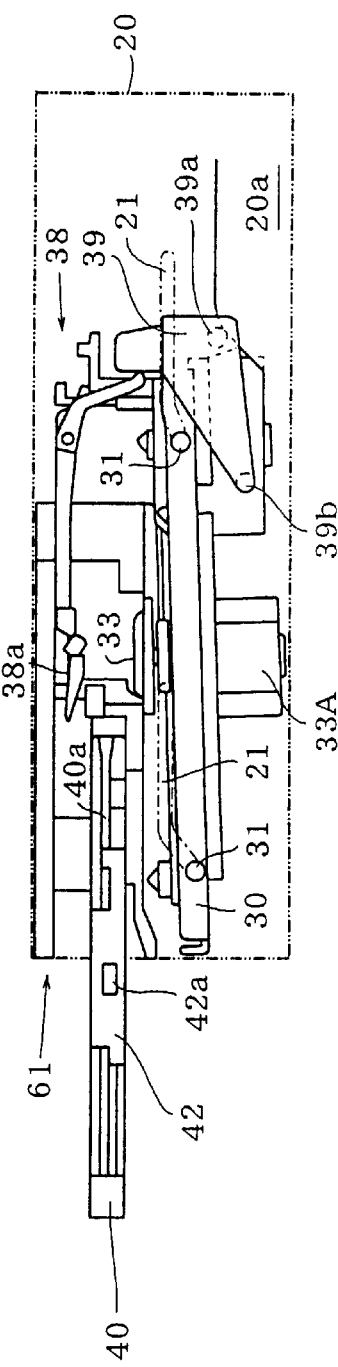
FIG. 6A
FIG. 6B

DISK PLAYER

BACKGROUND OF THE INVENTION

The present invention relates to a disk player which regenerates information from a disk-type recording medium and/or records information on the same, and more particularly to a disk player of a kind, which is improved in relationship between opening/closing timing of a shutter arranged on a disk cartridge for accommodating the disktype recording medium, and an information regenerating location and/or an information recording location. The present invention also relates to a disk player of a kind, which is improved in a driving mechanism thereof, for upward and downward shifting a recording mechanism which records information on the disk-type recording medium.

As is widely known, a disk cartridge of a disk player, which accommodates therein a disk-type recording medium, is provided with a slidable shutter for properly exposing an information surface of the disk-type recording medium. The shutter is closed normally, to thereby protect the disk-type recording medium in the disk cartridge from an external environment.

Therefore, in conventional disk players, when information is regenerated from the information surface of the disk-type recording medium or the information is recorded on the same, the following complicated operations are required: First, the disk cartridge is carried to a predetermined location by a carrier mechanism, and at the same time the shutter of the disk cartridge is fully opened by means of a shutter opening/closing mechanism mounted in the disk player, to thereby expose the information surface of the disk-type recording medium. Then, the information is regenerated from the exposed information surface by means of an optical pickup provided in the disk player, or the information is recorded on-,the exposed information surface by means of the optical pickup and a magnetic head.

The above-mentioned conventional disk players are operated in the following two modes with respect to information regeneration and information recording:

In the first mode, when the disk cartridge is located at an information regenerating location in the disk player, the shutter is fully opened by means of the shutter opening/closing mechanism. Thereafter, while the disk cartridge is further shifted from the location to an information recording location in the disk player, the magnetic head is disposed in sliding contact with the information surface of the disk-type recording medium, to thereby carry out information recording.

In the first mode, however, when the disk cartridge is further shifted from the information regenerating location to the information recording location, an additional configuration for shifting the shutter opening/closing mechanism of the disk player together with the disk cartridge, or alternatively a configuration for detaching the shutter opening/closing mechanism from the disk cartridge in the above state while maintaining the fully open state of the shutter is required. Therefore, the configuration for shifting both the carrier mechanism and the shutter opening/closing mechanism or the configuration for separating the two mechanisms from each other complicates and upsizes the disk player, resulting in an increased number of component elements and hence a rise in manufacturing costs.

on the other hand, in the second mode of the disk player, the information regenerating location and the information recording location are set to the same location, and the shutter is fully opened at the location, followed by disposing the magnetic head in sliding contact with the information surface of the disk-type recording medium to carry out information recording.

In this mode, however, the carrier mechanism must be detached from the disk cartridge, and then the magnetic head is driven to be disposed in sliding contact with the information surface of the disk-type information recording medium, by the carrier mechanism. Alternatively, a magnetic head driving mechanism for driving the magnetic head must be additionally installed. Therefore, if the carrier mechanism is further shifted or the magnetic head driving mechanism for driving the magnetic head is additionally employed, the construction of the disk player is further complicated and upsized. In addition, the number of component elements is increased, which inevitably leads to increase manufacturing costs of the disk player.

Besides, in either mode, to hold the information recording medium inserted into the disk player, on a turn table, a supporting member for supporting the turn table need to be relatively shifted with respect to the information recording medium, and further, during information recording, the magnetic head need to be relatively shifted with respect to the information recording medium. Thus, both the supporting member and the magnetic head need to be relatively shifted with respect to the information recording medium, which complicates and upsizes the driving mechanism, resulting in a further inconvenience, e.g. that the accuracy of a vertical location cannot be improved.

SUMMARY OF THE INVENTION

Therefore, it is a first object of the invention to provide a disk player which is capable of simplifying the construction of a shutter sliding mechanism for operating a shutter, such that the shutter is slide-opened/closed between a closed state and an open state, depending on the location of a disk cartridge when it is loaded on the disk player to carry out information regeneration or information recording.

It is a second object of the invention to provide a disk player which is capable of simplifying the construction of a driving mechanism as well as improving the accuracy of a vertical location of a magnetic head of an information recording mechanism with respect to the disk-type recording medium loaded on the disk cartridge.

To attain the first object, the present invention provides a disk player having a disk cartridge for being loaded on the disk player, and accommodating a disk-type recording medium having an information surface, the disk cartridge having a shutter arranged thereon for performing slide-opening/closing in order to expose the information surface of the disk-type recording medium, the disk player comprising a carrier mechanism for carrying the disk cartridge to an information regenerating location and an information recording location in the disk player, and a shutter sliding mechanism for slide-opening/closing the shutter arranged on the disk cartridge, wherein the shutter is in an intermediate position of sliding when the disk cartridge is located at one of the information regenerating location and the information recording location, and is in a terminal position of the sliding when the shutter is located at the other one of the information regenerating location and the information recording location.

As a result, the construction of the shutter sliding mechanism is simplified such that the shutter is slide-opened/closed between a closed state and an open state, depending on the location of the disk cartridge when it is loaded on the disk player to carry out information regeneration or information recording. The information surface of the disk-type recording medium can be exposed only in a range thereof required for information regeneration or information recording, whereby the protection of the information surface of the disk-type recording medium can be attained. Further, it is also possible to reduce the number of component elements and manufacturing cost of the disk player and to miniaturize the disk player.

Preferably, the disk player includes a disk rotating mechanism for holding and rotating the disk-type recording medium, and wherein the disk-type recording medium is loaded on the disk rotating mechanism before the shutter reaches the intermediate position of the sliding.

As a result, when the shutter of the disk cartridge assumes the intermediate position of the sliding, the disk-type recording medium in the disk cartridge is in a rotatable state. That is, when the shutter assumes the intermediate position of the sliding, the disk-type information recording medium can be located at either the information regenerating location or the information recording location.

More preferably, the disk player includes information reading means for reading information from the disk-type recording medium and information recording means for recording information on the disk-type recording medium, wherein the shutter is in the intermediate position of the sliding when the disk cartridge is located at the information regenerating location, to thereby allow the information reading means to read the information from the disk-type recording medium, and wherein the shutter is in the terminal position of the sliding when the disk cartridge is located at the information recording location, to thereby allow the information recording means to record the information on the disk-type recording medium.

As a result, when the disk cartridge is located at the information regenerating location, the shutter of the disk cartridge can be made half open, i.e. the information surface of the disk-type recording medium can be exposed only in a range thereof required for information regeneration, leading to protection of the information surface of the disk-type recording medium. Further, when the disk cartridge is located at the information recording location, the shutter of the disk cartridge can be fully opened.

Advantageously, operation of the shutter sliding mechanism for slide-opening/closing the shutter is achieved by linearly moving the carrier mechanism in predetermined directions.

As a result, complicated component elements for operating the carrier mechanism can be dispensed with, whereby the carrier mechanism can be operated in a simple manner with simple component elements.

To attain the second object, the present invention provides a disk player having a disk rotating mechanism for holding and rotating a disk-type information recording medium, a supporting member for mounting the disk rotating mechanism thereon, an information recording mechanism arranged on the supporting member, for recording information on the disk-type recording medium by approaching and leaving the disk-type recording medium, and a driving mechanism for driving the information recording mechanism, wherein the driving mechanism comprises an engaging element arranged on the supporting member and an engaged element which is formed separately from the engaging element and separated from the engaging element when the information recording mechanism is not driven.

As a result, the accuracy of a vertical location of the information recording mechanism with respect to the disk-type recording medium held on the disk rotating mechanism can be improved, and the construction of the driving mechanism can be simplified.

Preferably, the supporting member can perform reciprocating motion in predetermined directions, the engaging element is allowed to engage with and disengage from the engaged element, during the reciprocating motion of the supporting member in the predetermined directions.

As a result, the construction of the driving mechanism can be more simplified.

Also preferably, the supporting member can be relatively shifted with respect to the disk-type recording medium, during the reciprocating motion of the supporting member in the predetermined directions.

As a result, the accuracy of the vertical location of the information recording mechanism with respect to the disk-type recording medium can be more improved.

More preferably, with the shifting of the supporting member in one of the predetermined directions in the reciprocating motion, the engaging element is engaged with the engaged element and at the same time the disk-type recording medium is held on the disk rotating mechanism.

Further preferably, the driving mechanism drives the information recording mechanism upon the engagement between the engaging element and the engaged element.

As a result, the construction of the driving mechanism can be further simplified.

BRIEF DESCRIPTION OF THE DRAWINGS

The above and other objects, features and advantages of the present invention will be more apparent from the following detailed description taken in conjunction with the accompanying drawings in which:

FIG. 6A is a schematic plan view showing the disk player according to the embodiment, in which a disk cartridge is loaded on the disk player;

FIG. 6B is a schematic side view showing the disk player of FIG. 6A;

DETAILED DESCRIPTION OF THE PREFERRED EMBODIMENTS

The invention will now be described in detail with reference to the drawings showing an embodiment thereof.

Figure 1:
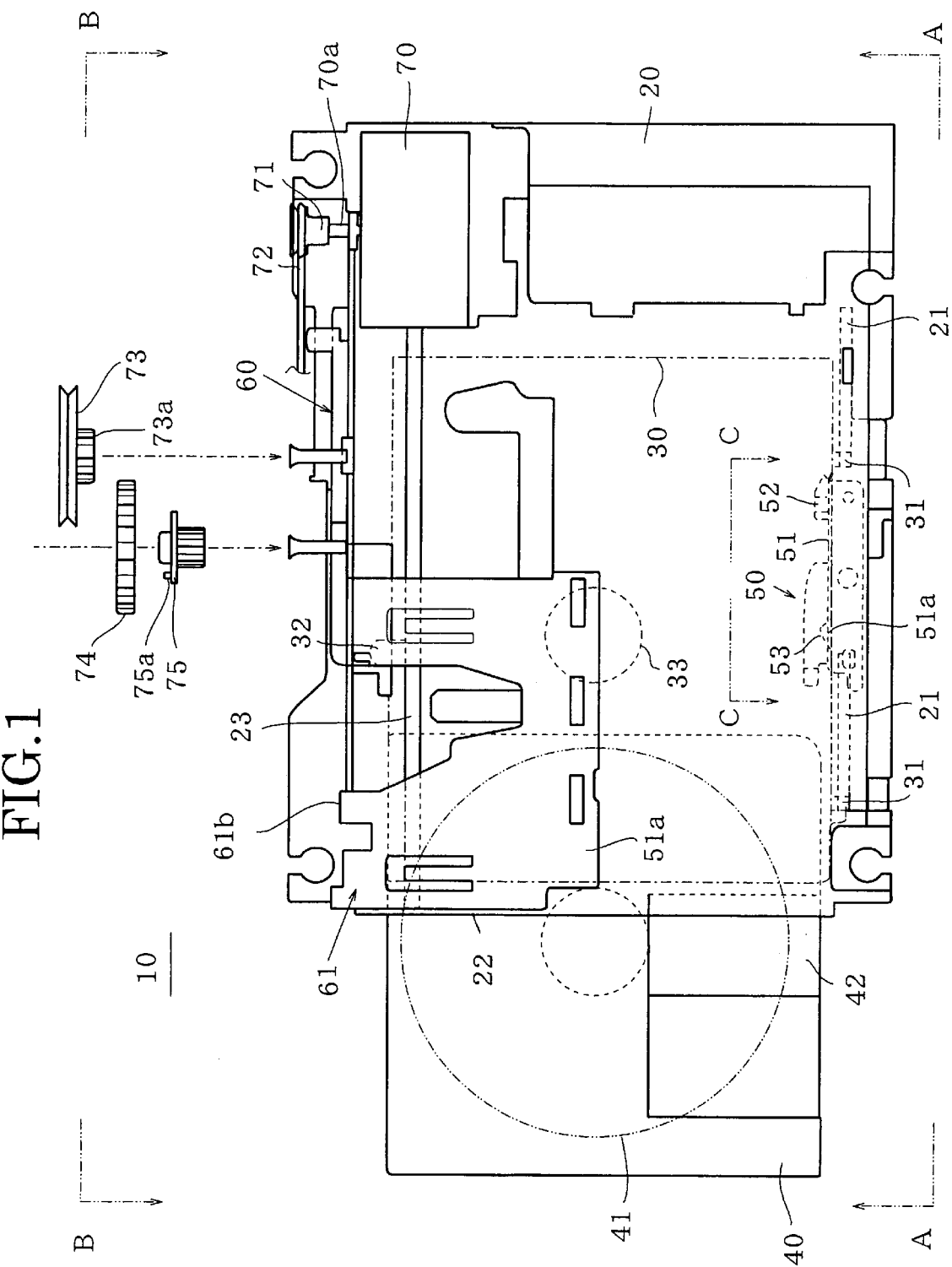
FIG. 1 is a schematic plan view showing a disk player according to an embodiment of the invention.

Referring first to FIGS. 1 to 5, there are schematically illustrated the construction and arrangement of a disk player according to the embodiment of the invention. In FIG. 1, reference numeral 10 designates the disk player which is comprised of a cartridge holder 20, a servomechanism 30, a disk cartridge 40, a shutter sliding mechanism 50, a carrier mechanism 60, and a driving motor 70.

The cartridge holder 20 has one side portion which has a plurality of guide grooves 21 formed in an internal surface thereof. The guide grooves 21 extends frontward and rearward of the disk player 10 (i.e. from side to side as viewed in the figures). The servomechanism 30 is installed in the cartridge holder 20 so as to be movable frontward and rearward along the guide grooves 21. Further attached to the one side portion of the cartridge holder 20 is the shutter sliding mechanism 50 for sliding a shutter 42 of the disk cartridge 40.

The cartridge holder 20 has the other side portion, on which are mounted the carrier mechanism 60 for carrying the disk cartridge 40 frontward and rearward and shifting the servomechanism 30 upward and downward as well as frontward and rearward, to thereby carry the disk cartridge 40 to a location at which information is regenerated and a location at which information is recorded, and the driving motor 70 which functions as a driving source for driving the carrier mechanism 60.

More specifically, the cartridge holder 20 forms a frame body, which has an opening 22 in an appropriate size formed in a front surface thereof. The disk cartridge 40 in a nearly rectangular shape and accommodating a disk-type recording medium 41 is inserted into the interior of the cartridge holder 20 or ejected toward the exterior of the same, by way of the opening 22.

The shutter 42 is located in the cartridge holder 20 at a location closer to the one side portion thereof, and functions to protect the disk-type recording medium 41 in the disk cartridge 40. A direction in which the shutter 42 is slided conforms to a direction in which the disk cartridge 40 is inserted and ejected.

Figure 2:
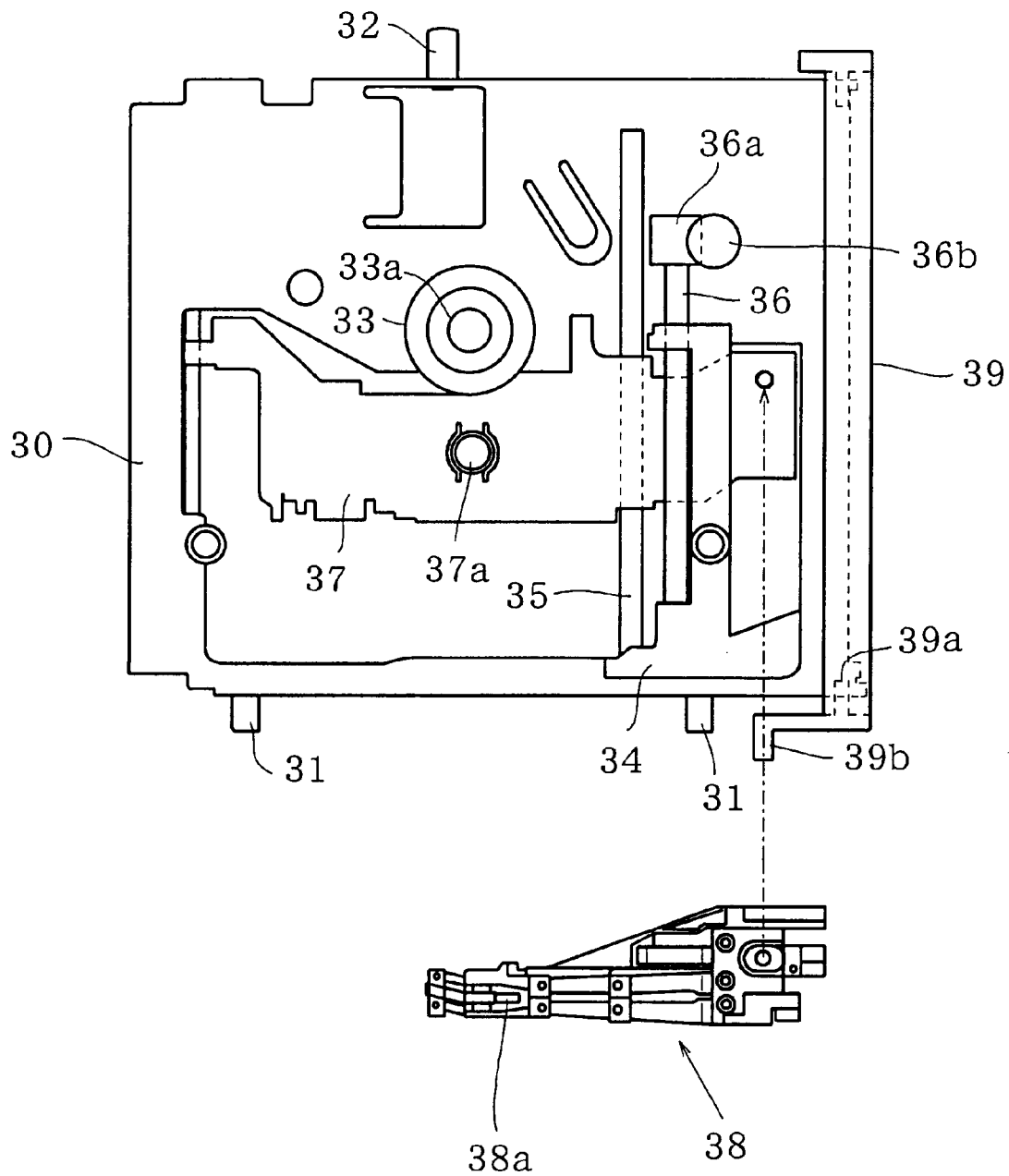
FIG. 2 is a schematic plan view showing the essential part of a servomechanism appearing in FIG. 1.
Figure 3:
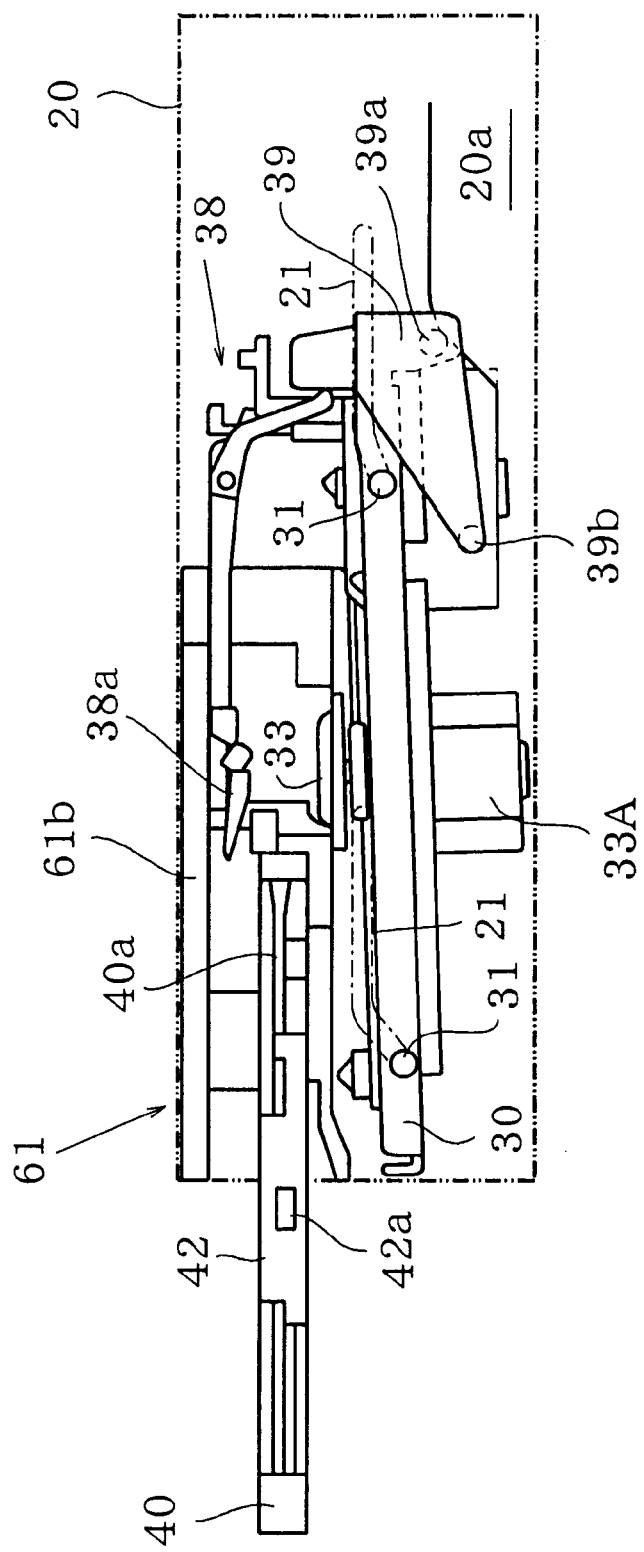
FIG. 3 is a view shown in FIG. 1 as viewed in a direction indicated by an arrow A—A.

As shown in FIG. 2, the servomechanism 30 as a supporting member forms a frame shape, and one side portion of the servomechanism 30 has a plurality of engaging pins 31 provided therefor in a horizontally protruding manner, which can be inserted into the guide grooves 21 of the cartridge holder 20, respectively. The engaging pins 31 are engaged with the guide grooves 21 in a slidable manner, which enables the servomechanism 30 to carry out its ascending/descending and reciprocating motions within the cartridge holder 20. The other side portion of the servomechanism 30 has an elevating pin 32 provided therefor, which ascends and descends along a slanting groove 63, referred to hereinafter, in a manner of horizontally protruding toward the outside.

A turn table 33 as a disk rotating mechanism is mounted on a central portion of the servomechanism 30, which functions to hold the disk-type recording medium 41 in the inserted cartridge 40 in a rotatable manner. Further, the servomechanism 30 has a lower surface to which is attached a spindle motor 33A having a spindle shaft 33a, for generating rotation (see FIG. 3). The turn table 33 is driven for rotation by the spindle shaft 33a.

Arranged on the servomechanism 30 are a guide shaft 35 and a worm gear 36 such that they extend from the one side portion to the other side portion of the servomechanism 30 in parallel with each other. The guide shaft 35 and the worm gear 36 each have one end thereof secured by a securing member 34 on the servomechanism 30. Engaged with the other end of the worm gear 36 is a driven gear 36a which is driven for rotation by engaging with a driving gear 36b. The driving gear 36b is driven for rotation by a small motor, not shown, installed in the servomechanism 30. Further, the other end of the guide shaft 35 is fitted into a fitting member, not shown, of the servomechanism 30, and supported by the same.

Attached to the guide shaft 35 and the worm gear 36 is a pickup 37 as information reading means which can reciprocate between the one side portion and the side of the turn table 33. The pickup 37 reciprocates by sliding on the guide shaft 35 while engaging with the worm gear 36 which is driven for rotation. Further, a lens 37a for irradiating laser beams for reading information is arranged on the pickup 37 at a location corresponding to the normal of the spindle shaft 33a.

Further, a recording mechanism 38 as information recording means for recording information on the disk-type recording medium 41 is mounted on the servomechanism 30 at a rear end of the pickup 37. The recording mechanism 38 has a magnetic head 38a which can ascend and descend according to the reciprocating motion of the servomechanism 30.

The recording mechanism 38 has a behavior of shifting in a direction of an information recording surface of the disk-type recording medium 41, i.e. the descending behavior, imparted by an elastic element, not shown. When the servomechanism 30 is located at a front end of the cartridge holder 20 and at the same time the disk cartridge 40 is not loaded on the same, the recording mechanism 38 is held in an erect state by means of a head lifter 39 which rests against and engages with the same. The head lifter 39 is attached to a rear end of the servomechanism 30 in a rotative manner by a rotary shaft 39a, and at the same time has a force imparted thereto to rise against the descending behavior of the recording mechanism 38 by means of a spring, not shown. When the disk cartridge 40 is loaded on the servomechanism 30 and then the servomechanism 30 and the recording mechanism 38 are unitedly shifted to the rear end of the cartridge holder 20, a sliding pin 39b as an engaging element which is provided on a lower portion of the head lifter 39 engages with a slanting section 20a as an engaged element which is provided in the cartridge holder 20, for the first time. Then, the sliding pin 39b is shifted upward along the slanting section 20a, whereby the head lifter 39 rotatively leaves from the recording mechanism 38. Thereafter, the erect state of the recording mechanism 38 is released, followed by biasing the magnetic head 38a on the information surface of the disk-type recording medium 41.

The shutter sliding mechanism 50 for sliding the shutter 42 of the disk cartridge 40 is arranged at a location on the one side portion of the cartridge holder 20 as appropriate. The location at which the shutter sliding mechanism 50 is arranged is determined such that the shutter 42 of the disk cartridge 40 assumes an intermediate position of sliding when the inserted disk cartridge 40 is located at one of the information regenerating location and the information recording location, and the shutter 42 assumes a terminal position of sliding when the disk cartridge 40 is located at the other of the two locations.

Figure 5:
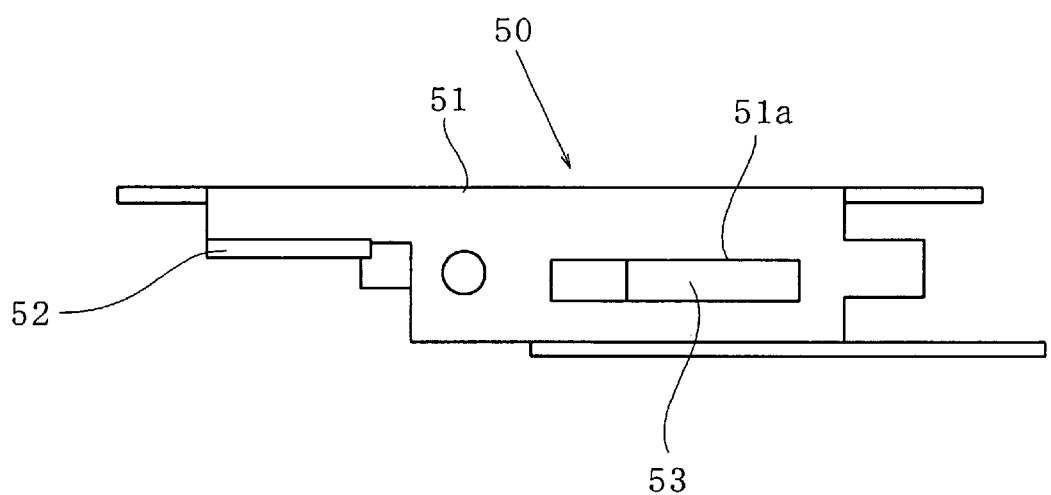
FIG. 5 is a view shown in FIG. 1 as viewed in a direction indicated by an arrow C—C.
Figure 7:
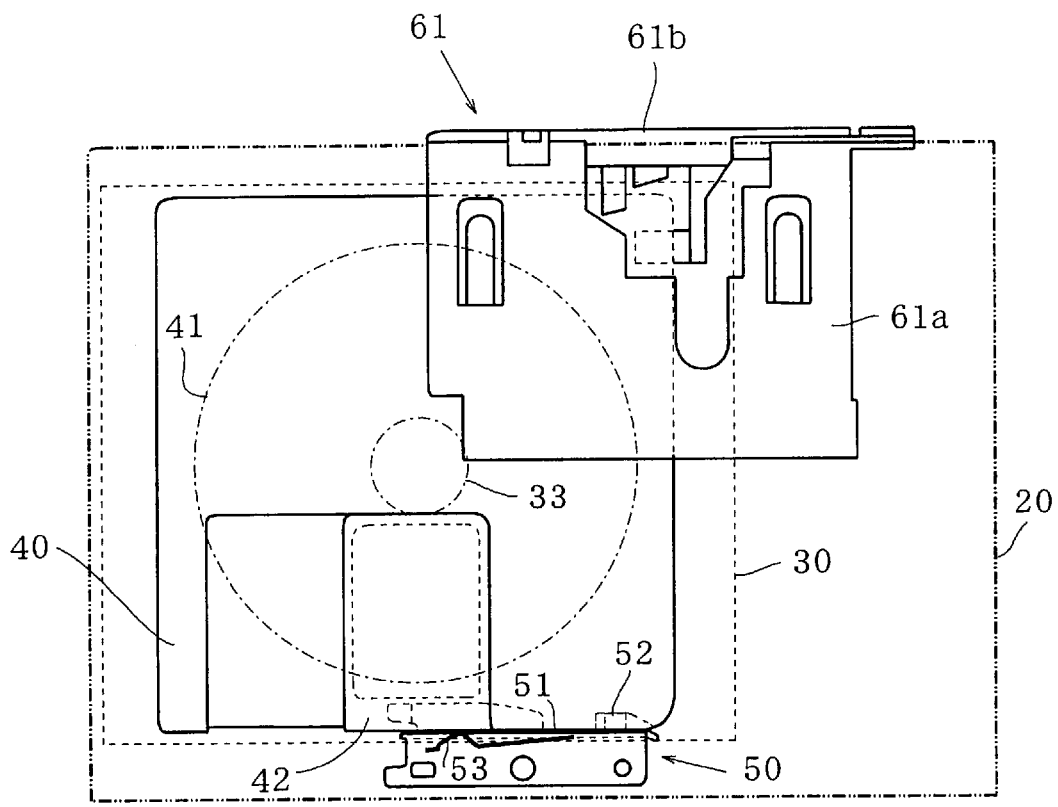
FIG. 7A is a schematic plan view showing the disk player according to the embodiment, in which the disk cartridge is loaded on the disk player.
FIG. 7B is a schematic side view showing the disk player of FIG. 7A.
Figure 7:
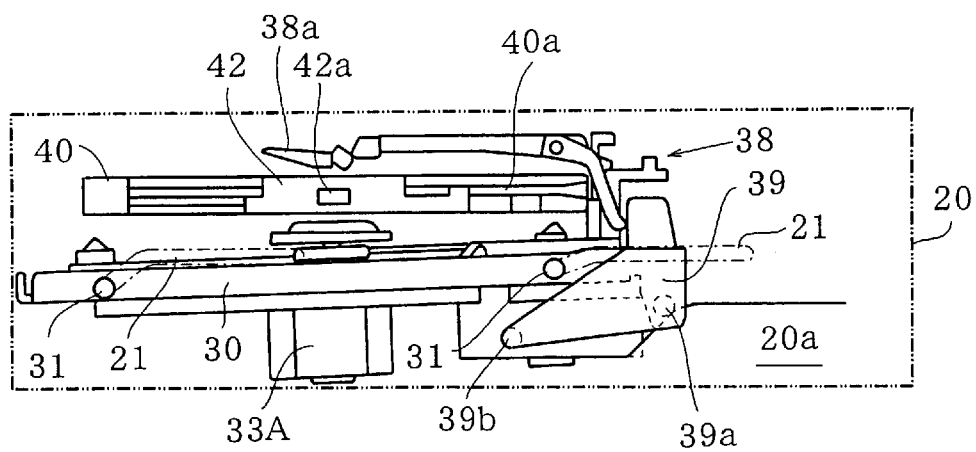
Figure 8:
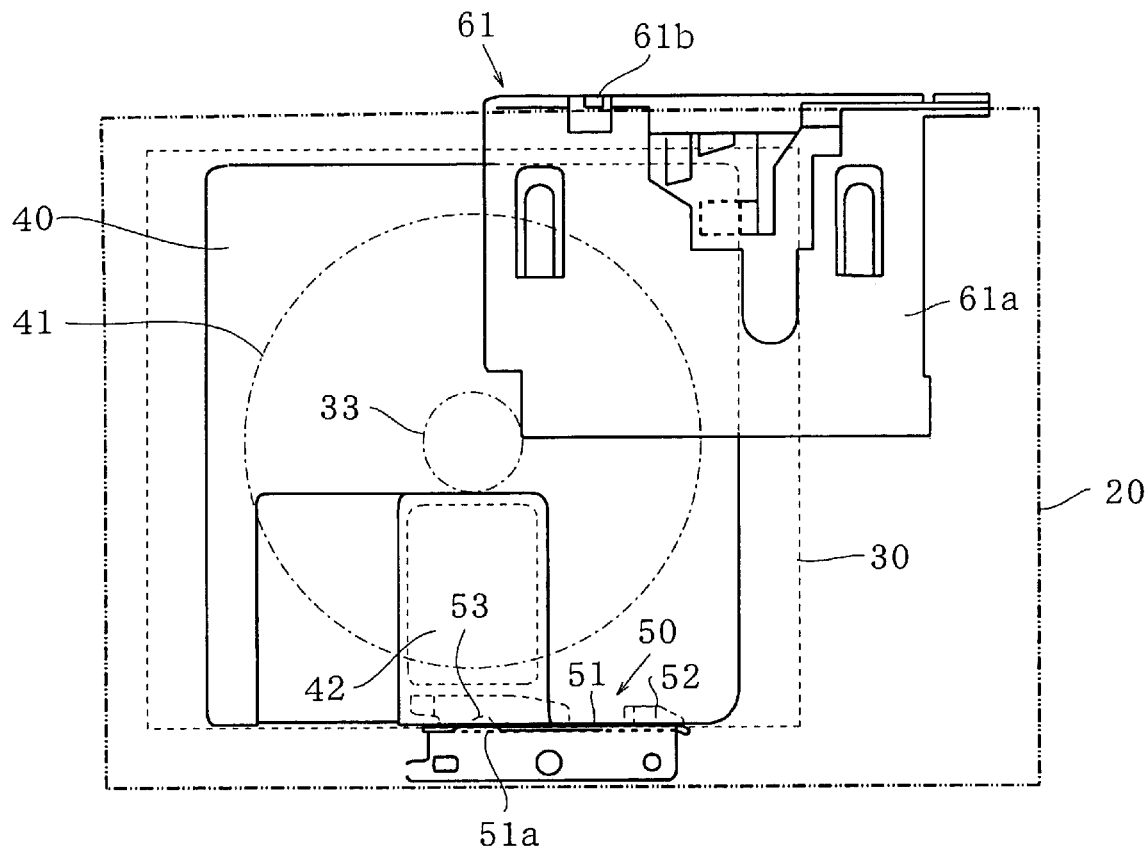
FIG. 8A is a schematic plan view showing the disk player according to the embodiment, in which the disk cartridge is loaded on the disk player.
FIG. 8B is a schematic side view showing the disk player of FIG. 8A.
Figure 8:
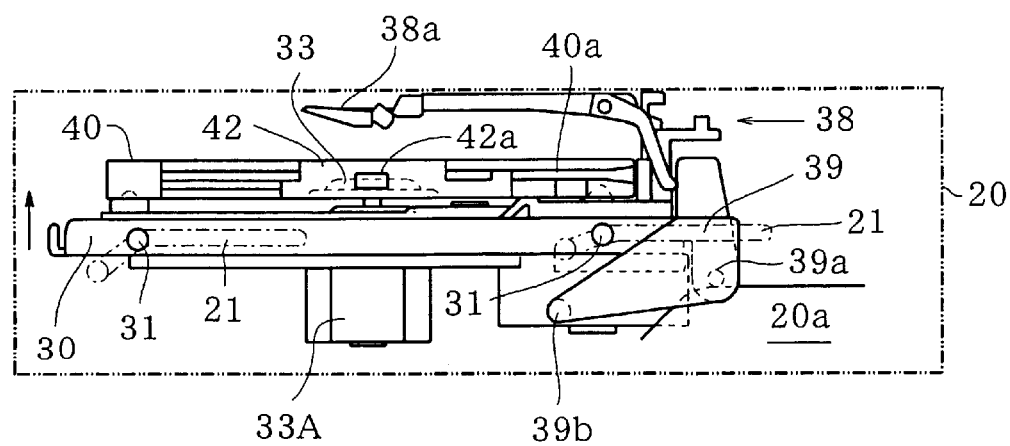
Figure 9:
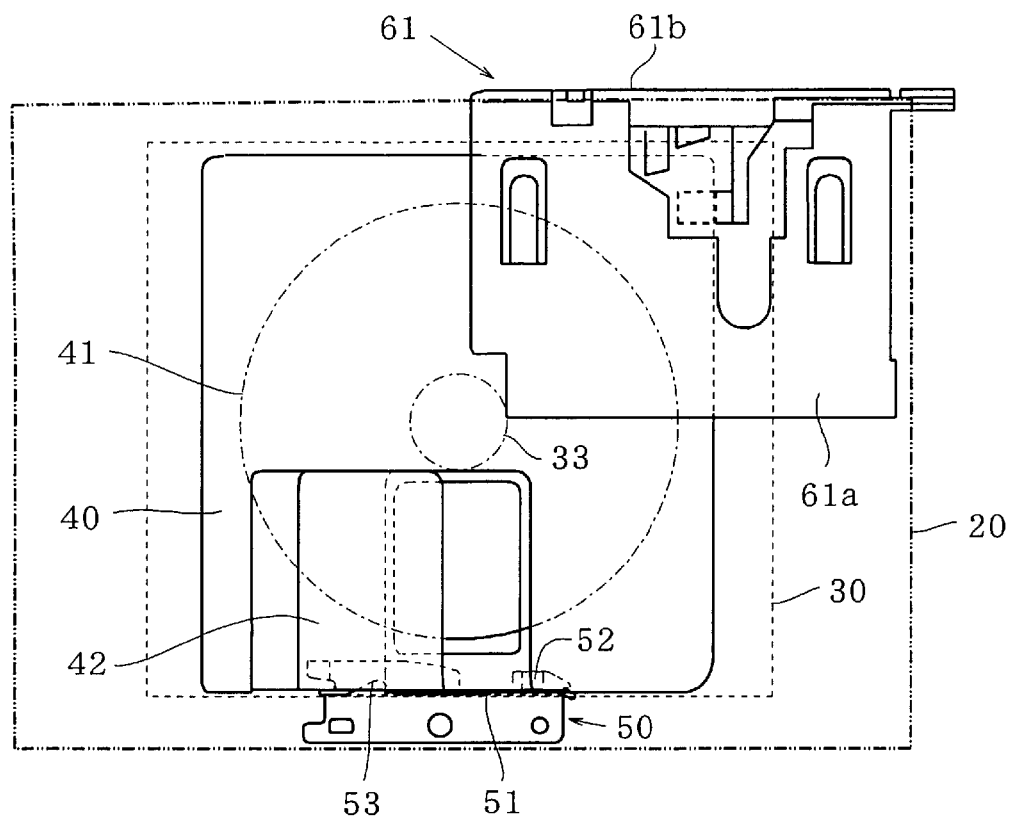
FIG. 9A is a schematic plan view showing the disk player according to the embodiment, in which the disk cartridge is located at an information regenerating location.
FIG. 9B is a schematic side view showing the disk player of FIG. 9A.
Figure 9:
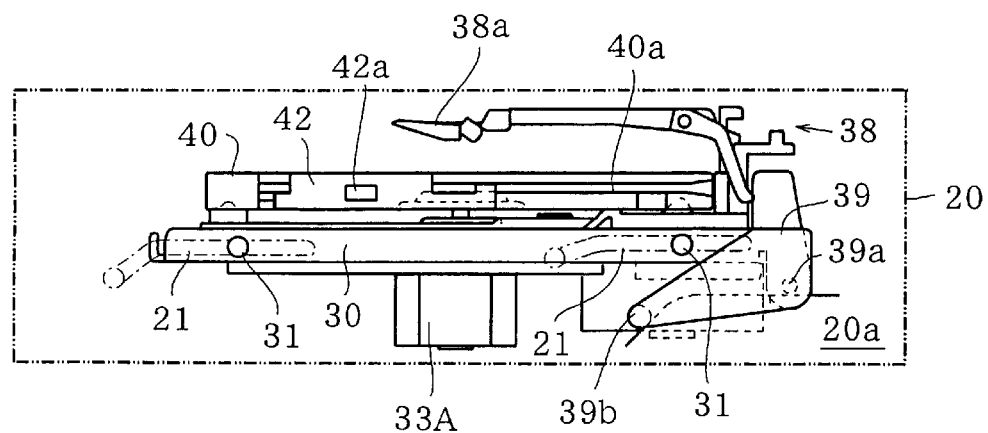
Figure 10:
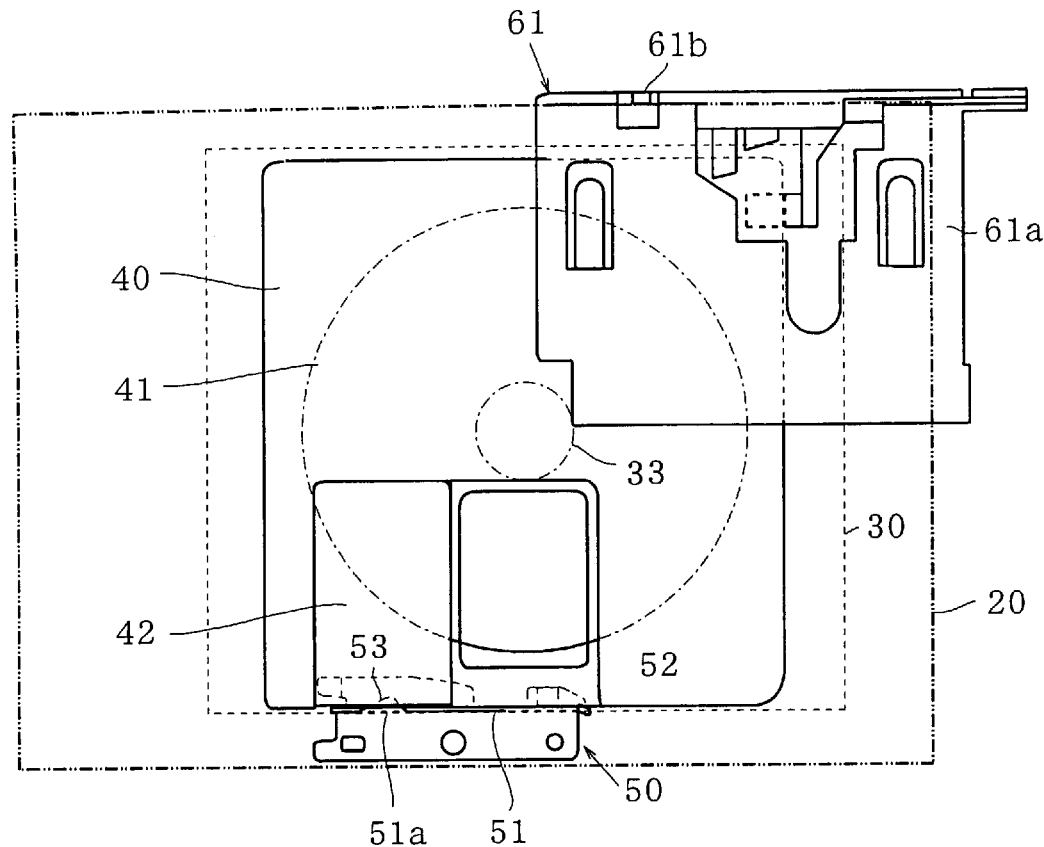
FIG. 10A is a schematic plan view showing the disk player according to the embodiment, in which the disk cartridge is located at an information recording location.
FIG. 10B is a schematic side view showing the disk player of FIG. 10A.
Figure 10:
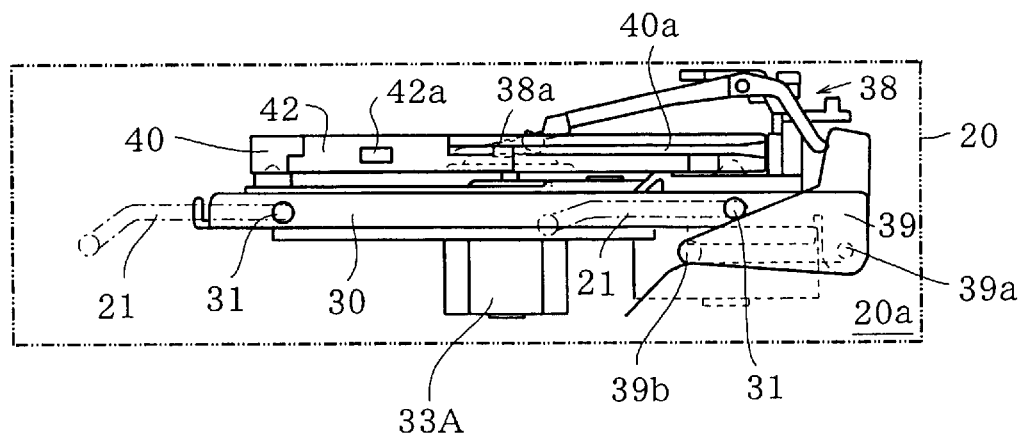

As shown in FIG. 5, the shutter sliding mechanism 50 is comprised of a shutter sliding mechanism main body 51 configured by folding a flat element, a side hole 51a formed therein, and an overhang plate 52 attached thereto. The shutter sliding mechanism 50 includes a folded plate spring 53 which is engaged in a sliding manner with a concave portion 42a formed in the shutter 42. The plate spring 53 has one end thereof protrude from the side hole 51a of the shutter sliding mechanism main body 51 as appropriate, and the other end thereof secured to the main body 51. The overhang plate 52 is a flat plate, and formed so as to be inserted into a guide groove 40a formed in the disk cartridge 40. While the overhang plate 52 is inserted into the guide groove 40a, it squeezes an urging spring, not shown, of the disk cartridge 40, which has pressed the shutter 42 so as not to open, whereby the shutter 42 is allowed to perform sliding.

The carrier mechanism 60 mounted on the other side portion of the cartridge holder 20 carries the disk cartridge 40 in a direction almost in parallel with the direction in which the shutter 42 of the disk cartridge 40 is slidden, and functions such that the disk cartridge 40 is carried to the information regenerating location and the information recording location by a carrier 61 which is installed in the cartridge holder 20 in a manner of freely movable frontward and rearward with respect to the same.

The carrier 61 is comprised of a base 61a in a laid F-shape, and side plates 61b and 61c, and capable of reciprocating along a carrier groove 23 formed in an upper surface of the cartridge holder 20 in the frontward and rearward directions with respect to the same.

Figure 4:
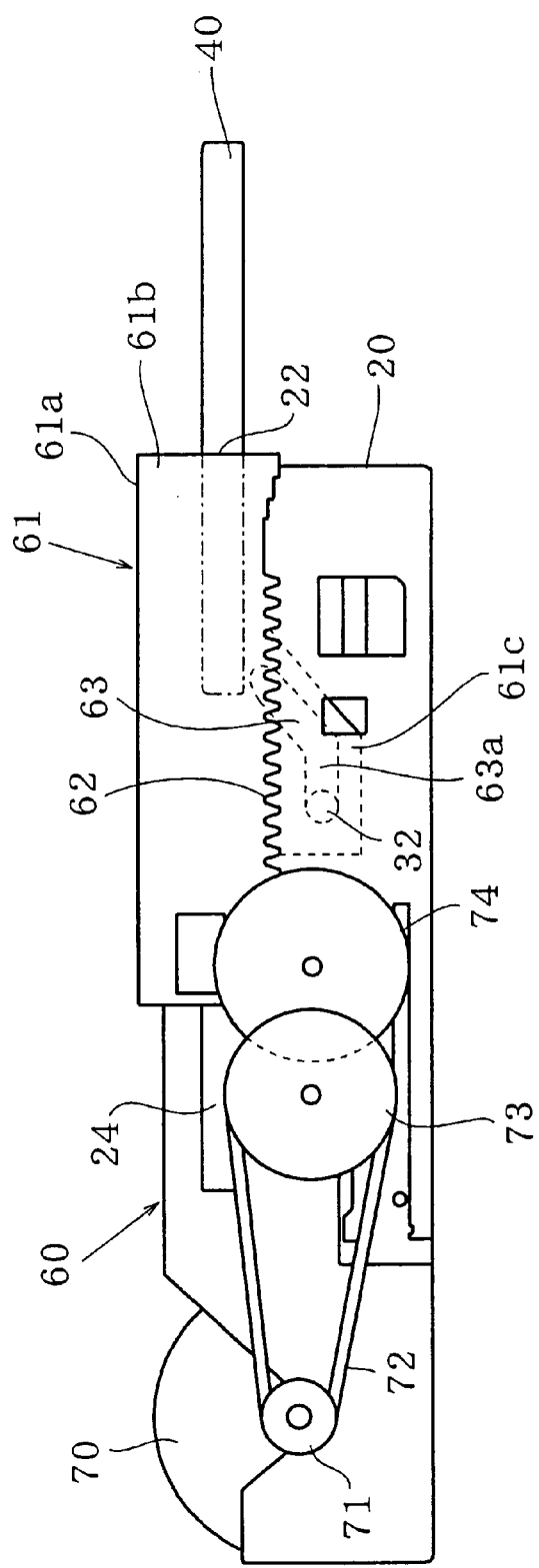
FIG. 4 is a view shown in FIG. 1 as viewed in a direction indicated by an arrow B—B.

As shown in FIG. 4, the side plate 61b of the carrier 61 is formed so as to face downward along the other side surface of the cartridge holder 20. Further attached to the side plate 61b at an upper location thereof are the side plate 61c, a carrier lock, and an engaging hook, the latter two of which are not shown. The side plate 61c is inserted into the cartridge holder 20 from a side opening 24 formed in the other side of the cartridge holder 20. The carrier lock functions to lock the carrier 61 with respect to the cartridge holder 20, which releases locking of the carrier 61 when the disk cartridge 40 is inserted into the cartridge holder 20, to thereby allow the carrier 61 to be shifted. The engaging hook is engaged with part of the side surface of the cartridge holder 20, whereby the carrier 61 is engaged with the cartridge holder 20.

The side plate 61b of the carrier 61 has a lower surface in which is formed a rack section 62 in a range as appropriate. The rack section 62 can be engaged with a driving gear 75, referred to hereinafter, and therefore the carrier 61 can be shifted frontward and rearward by driving the driving gear 75 for rotation.

On the other hand, the side plate 61c of the carrier 61 is located inside the other side surface of the cartridge holder 20, and has a side surface in which is formed the slanting groove 63 inclusive of a horizontal groove 63a in a range as appropriate. The elevating pin 32 of the servomechanism 30 is engaged with the slanting groove 63 in a slidable manner. The back-and-forth motion of the carrier 61 shifts the elevating pin 32 of the servomechanism 30 upward and downward along the slanting groove 63, whereby the one side portion (i.e. the side of the elevating pin 32) of the servomechanism 30 can be engaged with or disengaged from the cartridge holder 20. Even after the elevating pin 32 rests against an upper edge of the slanting groove 63, further movement of the carrier 61 can shift the engaged carrier 61 and servomechanism 30 in one body, which further enables the servomechanism 30 to be shifted frontward and rearward along the guide groove 21 of the cartridge holder 20.

The driving motor 70 as a driving source for driving the carrier mechanism 60 is mounted on the other side surface of the cartridge holder 20 at a rear end thereof.

The driving motor 70 has a driving shaft 70a equipped with a driving pulley 71 which is in turn wrap-connected to a driven pulley 73 by a V belt 72. The driven pulley 73 is axially supported by the other side surface of the cartridge holder 20. The driven pulley 73 has a small gear 73a integrally formed therewith, and the small gear is arranged so as to be engaged with a reduction gear 74 axially supported on the other side surface of the cartridge holder 20.

Further, a driving gear 75 is coaxially mounted inside the reduction gear 74 so as to be engageable with the rack section 62 formed in the lower surface of the side plate of the carrier 61.

The reduction gear 74 has a semicircular groove, not shown, at an inner radius thereof. The driving gear 75 has a projection 75a arranged thereon, which is engaged with an edge of the semicircular groove. This arrangement enables the driving gear 75 to be driven for rotation only after the reduction gear 74 is rotated about a half turn (see FIGS. 1 and 4).

Next, description will be made of the operation of the disk player 10 described above, according to the embodiment, with reference to FIGS. 6 to 10. In the figures, part of the construction of the disk player 10 is omitted in order to facilitate understanding of the operation, and therefore the construction omitted from these figures should be referred to FIGS. 1 to 5.

FIGS. 6A and 6B are a plan view and a side view, respectively, schematically showing the disk player 10 according to the embodiment, in which the disk cartridge 40 is inserted into the opening 22 formed in the front surface of the cartridge holder 20 loaded on the disk player 10.

The carrier 61 is located at a front location, i.e. at a left end of the cartridge holder 20 as viewed in the figures. At this location, the rack section 62 of the carrier 61 has not been engaged with the driving gear 75.

Further, the plate spring 53 protruding from the side hole 51a of the shutter sliding mechanism main body 51 and the overhang plate 52 have not been made contact with the disk cartridge 40.

When the cartridge 40 is inserted into the cartridge holder 20 to a certain extent, the carrier lock, not shown, is released, to thereby allow the carrier 61 to be shifted. At the same time, the engaging hook is engaged with an engaging hole, not shown, formed in the side surface of the disk cartridge 40, whereby the disk cartridge 40 and the carrier 61 are shifted in one body.

At this time, the carrier 61 is shifted as appropriate toward the rear of the cartridge holder 20 along the carrier groove 23, which enables the rack section 62 of the carrier 61 to be engaged with the driving gear 75, and hence a switch for rotation, not shown, of the driving motor 70 is turned on, to thereby drive the driving motor 70 for rotation.

The rotation started by actuating the driving motor 70 is transferred to the driving pulley 71, the V belt 72, the driven pulley 73, the small gear 73a, and the reduction gear 74 in succession. Further, when the reduction gear 74 is rotated about a half turn, the driving gear 75 is started for rotation.

As the carrier 61 is shifted rearward caused by the rotation of the driving motor 70, the disk cartridge 40 is conveyed toward the rear of the cartridge holder 20. Before the central location of the disk cartridge 40 almost coaxially corresponds to the central location of the turn table 33 on the servomechanism 30, the elevating pin 32 of the servomechanism 30 is only disposed in sliding contact with the horizontal groove 63a formed in the side plate 61c of the carrier 61. Therefore, even if the carrier 61 is shifted rearward, the location of the elevating pin 32 is not changed, leading to no change in location of the servomechanism 30.

At this time, the plate spring 53 protruding from the side hole 51a of the shutter sliding mechanism main body 51 is pressed inside the side hole 51a due to the sliding contact with the disk cartridge 40. Further, the overhang plate 52 is introduced in the guide groove 40a of the disk cartridge 40 (see FIGS. 7A and 7B).

As soon as the central location of the disk cartridge 40 almost coaxially corresponds to the central location of the turn table 33 on the servomechanism 30, the disk cartridge 40 and the servomechanism 30 are started to move in one body.

More specifically, as the carrier 61 is shifted rearward due to the rotation of the driving motor 70, the disk cartridge 40 and the servomechanism 30 are conveyed rearward.

At this time, the elevating pin 32 present in the horizontal groove 63a of the side plate 61c of the servomechanism 30 is shifted to the slanting groove 63 according to the shift of the carrier 61. Then, the elevating pin 32 is started to move upward along the slanting groove 63, leading to ascent of the one side portion (the side of the elevating pin 32) of the servomechanism 30. Thereafter, the elevating pin 32 rests against the upper edge of the slanting groove 63, leading to shift of the carrier 61 and the servomechanism 30 in one body. As a result, the engaging pins 31 of the servomechanism 30 which are engaged with the guide grooves 21 of the cartridge holder 20 are started to move along the guide grooves 21, leading to ascent of the other side portion (the side of the engaging pins 31) of the servomechanism 30 in synchronization with the rearward shifting of the servomechanism 30. Then, the servomechanism 30 approaches the disk cartridge 40, to thereby allow the disk cartridge 40 to mount the disk-type recording medium 41 on the turn table 33 of the servomechanism 30.

At this time, the plate spring 53 protruding from the side hole 51a of the shutter sliding mechanism main body 51 rests against and engages with the concave portion 42a of the disk cartridge 40, and the overhang plate 52 has been inserted into the guide groove 40a in the disk cartridge 40, leading to squeezing the urging spring, not shown, of the disk cartridge 40 which has pressed the shutter 42 so as not to open, whereby the shutter 42 is allowed to be slidable (see FIGS. 8A and 8B).

When the mounting of the disk cartridge 40 on the servomechanism 30 is completed, since the elevating pin 32 has rested against the upper edge of the slanting groove 63, the carrier 61 and the servomechanism 30 can be shifted rearward in one body.

When the carrier 61 is further shifted for a predetermined distance, the plate spring 53 protruding from the side hole 51a of the shutter sliding mechanism main body 51 and the overhang plate 52 cooperate to slide-open the shutter 42, and therefore the information surface of the disk-type recording medium 41 is exposed, whereby the recording medium 41 falls in the information regenerating location. At this information regenerating location, the shutter 42 of the disk cartridge 40 is not fully opened, but is opened to an extent such that laser beams emitted from the lens 37a, for reading information can be irradiated on the disk-type recording medium 41.

Further, the rotation of the driving motor 70 is terminated by turning off a switch, not shown, and the shifting of the carrier 61 is also terminated, to thereby carry out regeneration of the disk-type recording medium 41 accommodated in the disk cartridge 40 (see FIGS. 9A and 9B).

When information is recorded on the disk-type recording medium 41, the driving motor 70 which has been terminated is further driven for rotation, to thereby further shift the carrier 61 rearward, i.e. rightward as viewed in FIG. 9A. Then, the servomechanism 30 and the disk cartridge 40 are shifted rearward according to the further shifting of the carrier 61. As a result, the shutter sliding mechanism 50 secured to the cartridge holder 20 functions to further slide-open the shutter 42 until the shutter 42 assumes the sliding terminal position. Thus, the information surface of the disk-type recording medium 41 is further exposed, whereby the disk-type recording medium 41 falls in the information recording location.

At this information recording location, the shutter 42 of the disk cartridge 40 is fully opened.

Since the servomechanism 30 and the disk cartridge 40 are shifted in one body to the information recording location, the sliding pin 39b as the engaging element of the head lifter 39 provided on the servomechanism 30 is engaged with the slanting section 20a as the engaged element, and the sliding pin 39b ascends to the upper location of the slanting section 20a. By this ascent, the head lifter 39 is rotated to lower the recording mechanism 38. At this time, the shutter 42 of the disk cartridge 40 has slid to be in the fully open state, and therefore the magnetic head 38a is biased on the disk-type recording medium 41 to record information (see FIGS. 10A and 10B).

According to the embodiment described above, connection between the servomechanism 30 and the disk cartridge 40 is achieved only by performing linear carriage operation of the carrier 61 with respect to the cartridge holder 20, and the ascending/descending operation of the recording mechanism 38 is triggered by the linear carriage operation. As a result, component elements for operating the carrier mechanism of the disk player can be minimized and aggregated.

Further, only the reciprocating motion of the carrier 61 can shift the elevating pin 32 of the servomechanism 30 upward and downward along the slanting groove 63 formed in the carrier 61. As a result, a structure for attaching and detaching the servomechanism 30 to and from the disk cartridge 40 can be configured in a simple manner.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A disk player having a disk cartridge for being loaded on said disk player, and accommodating a disk-type recording medium having an information surface, said disk cartridge having a shutter arranged thereon for performing slide-opening/closing in order to expose said information surface of said disk-type recording medium, said disk player comprising:

a carrier mechanism for carrying said disk cartridge to an information regenerating location and an information recording location in said disk player; and a shutter sliding mechanism for slide-opening/ closing said shutter arranged on said disk cartridge;

wherein said shutter is in an intermediate position of sliding when said disk cartridge is located at one of said information regenerating location and said information recording location, and is in a terminal position of said sliding when said shutter is located at the other one of said information regenerating location and said information recording location.

2. A disk player according to claim 1, including a disk rotating mechanism for holding and rotating said disk-type recording medium, and wherein said disk-type recording medium is loaded on said disk rotating mechanism before said shutter reaches said intermediate position of said sliding.

3. A disk player according to claim 2, including information reading means for reading information from said disk-type recording medium and information recording means for recording information on said disk-type recording medium, wherein said shutter is in said intermediate position of said sliding when said disk cartridge is located at said information regenerating location, to thereby allow said information reading means to read said information from said disk-type recording medium, and wherein said shutter is in said terminal position of said sliding when said disk cartridge is located at said information recording location, to thereby allow said information recording means to record said information on said disk-type recording medium.

4. A disk player according to any of claims 1 to 3, wherein operation of said shutter sliding mechanism for slide-opening/closing said shutter is achieved by linearly moving said carrier mechanism in predetermined directions.

* * * * *